United States Patent
Du et al.

(10) Patent No.: US 10,164,866 B2
(45) Date of Patent: Dec. 25, 2018

(54) VIRTUAL EXTENSIBLE LAN INTERCOMMUNICATION MECHANISM FOR MULTICAST IN NETWORKING

(71) Applicant: International Business Machines Corporation, Armonk, NY (US)

(72) Inventors: Kai Hong Du, Shanghai (CN); Zi Jin Tao, Wuxi (CN); Lu Zhang, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/198,367

(22) Filed: Jun. 30, 2016

(65) Prior Publication Data
US 2018/0006930 A1 Jan. 4, 2018

(51) Int. Cl.
| | |
|---|---|
| *H04L 12/761* | (2013.01) |
| *H04L 12/46* | (2006.01) |
| *H04L 12/715* | (2013.01) |
| *H04L 29/08* | (2006.01) |

(52) U.S. Cl.
CPC .......... *H04L 45/16* (2013.01); *H04L 12/4633* (2013.01); *H04L 12/4641* (2013.01); *H04L 45/64* (2013.01); *H04L 67/10* (2013.01); *H04L 67/28* (2013.01)

(58) Field of Classification Search
CPC ... H04L 12/185; H04L 12/1854; H04L 12/18; H04L 45/16; H04L 47/15; H04L 63/0876; H04L 12/4641; H04L 45/34; H04L 12/46; H04L 49/70; H04L 49/00; H04L 61/103; H04L 41/0893; G06F 2009/45595; G06F 9/50

See application file for complete search history.

(56) References Cited

U.S. PATENT DOCUMENTS

| | | | |
|---|---|---|---|
| 2014/0086253 A1 | 3/2014 | Yong | |
| 2014/0192804 A1 | 7/2014 | Ghanwani et al. | |
| 2015/0055651 A1* | 2/2015 | Shen | H04L 12/1854 370/390 |

(Continued)

FOREIGN PATENT DOCUMENTS

| | | |
|---|---|---|
| WO | 2014067280 A1 | 5/2014 |
| WO | 2015085523 A1 | 6/2015 |

OTHER PUBLICATIONS

Black et al. "An Architecture for Overlay Networks (NVO3) draft-narten-nvo3-arch-00", retrieved from https://tools.ietf.org/html/draft-narten-nvo3-arch-00; Jul. 2013.

(Continued)

*Primary Examiner* — Yemane Mesfin
*Assistant Examiner* — Mon Cheri S Davenport
(74) *Attorney, Agent, or Firm* — Brown & Michaels, PC; David Woycechowsky (57) ABSTRACT

A mechanism for multicast (M-VIM) is used to resolve address looking up problems for different types of VXLAN related overlay networks for multicast and broadcast traffics. A Multicast Overlay Ferry Proxy (MOFP) is introduced between a VXLAN domain and the CNI domain for ferrying control plane and data panel information. The M-VIM mechanism comprises three parts: a VXLAN Module; a CNI Module; and a proxy mechanism.

9 Claims, 6 Drawing Sheets

(56) References Cited

U.S. PATENT DOCUMENTS

2015/0372869 A1 12/2015 Rao et al.
2016/0094650 A1* 3/2016 Garcia de Rio ........ H04L 47/78
709/226

OTHER PUBLICATIONS

Arista, "VXLAN: Scaling Data Center Capacity", White Paper; https://www.arista.com/en/component/itpgooglesearch/search?gsquery=VXLAN ; at least as early as Jun. 2016.
Moreno, V. "VXLAN Deployment Models A practical perspective", Cisco live; https://www.ciscolive.com/online/connect/sessionDetail.ww?SESSION_ID=83984&tclass=popup; 2015.
"VMware Network Virtualization Design Guide", Technical White Paper, www.vmware.com/files/pdf/techpaper/Virtual-Network-Design-Guide.pdf; Jan. 2013.
"VXLAN Overview: Cisco Nexus 9000 Series Switches", retrieved from http://www.cisco.com/c/en/us/products/collateral/switches/nexus-9000-series-switches/white-paper-c11-729383.html; Nov. 2013.

* cited by examiner

VIRTUAL EXTENSIBLE LAN INTERCOMMUNICATION MECHANISM FOR MULTICAST IN NETWORKING

BACKGROUND

The present invention relates to a network virtualization technology and more specifically to a Virtual eXtensible LAN (VXLAN) intercommunication mechanism for multicast (M-VIM) in cloud networking.

An overlay network is created on top of an existing network by generating logical communication links between hosts within the service domain. The communication links are commonly implemented by tunneling, where a delivery network protocol encapsulates a payload protocol.

VXLAN is a network virtualization technology widely used in Data Center Networking (DCN) that attempts to improve the scalability problems associated with large cloud computing deployments. It uses a virtual LAN (VLAN)-like encapsulation technique such as MAC Address-in-User Datagram Protocol (MAC-in-UDP) to encapsulate MAC-based OSI layer 2 Ethernet frames within layer 4 UDP packets.

VXLAN makes it possible for the Virtual Machine (VM)'s transparent transfer between hosts, and even data centers. VXLAN solves the problem of inadequate Table Sizes at Top of Rack (ToR) Switches, and breaks the limit of 4096 VLAN id's (the "4K limit") in the traditional VLAN, as well as the low link utilization efficiency induced by the classical Spanning Tree.

But, under the VXLAN standard, there are still some variants for which Control Planes (CP) are implemented in a different way, but use the same encapsulation format as VXLAN, such as IBM Software Defined Network-Virtual Environment (SDN-VE). The encapsulation format is based on a Centralized Network Virtualization Overlay (NVO3) Implementation (CNI), which uses a centralized policy server to support a tunnel resolution instead of relying on a multicast query scheme which is now the core tunnel resolution mechanism of VXLAN. VXLAN related NVO3 implementations are referred to as Centralized NVO3 Implementation (CNI) due to their centralized control plane.

VXLAN and Centralized NVO3 implementation (CNI) have compatible data frame formats. Both of VXLAN and CNI provide an overlay solution for expanding a layer 2 network over a layer 3 network. The overlay solution is comprised of a stateless tunneling protocol, where layer 2 frames are wrapped within layer 3 packets, after adding a VXLAN header containing a 24-bit VXLAN Network Identifier (VNID). A VNID identifies an overlay network segment, thus expanding the number of unique virtual segment to 16M. An endpoint of a virtual segment is called a Virtual Tunnel Endpoint (VTEP), and is located within the hypervisor on the hosting server, thus the VXLAN header is known only to VTEPs, and the VTEP performs the encapsulation/de-capsulation work when it receives data traffic from the overlay port or underlay port.

However, there are many differences in multicast traffic forwarding behavior between VXLAN and CNI domains.

VXLAN has no dedicated control plane, that is, there is no out-of-band mechanism that could be used for VMs to register their tunnel information. A VXLAN VNID is mapped to an underlay multicast address.

Conventionally, in VXLAN, a Host1 spawns a VM with MAC1 in VNID 5001. Then Host1 will send an Internet Group Management Protocol (IGMP) join packet for underlay multicast group 239.1.1.100. VM with MAC2 and Host4 do the same thing after the VM spawn.

The VM with MAC1 starts sending broadcast/multicast to its destination. Host1 encapsulates this packet with a VXLAN header, and with a destination, which is 239.1.1.100. Then, any host with VNID 5001 could receive this broadcast/multicast traffic.

In the CNI domain, data traffic is handled by distributed data plane entities called the Network Virtualization Edges (NVE), while control is achieved through a control plane engine called Network Virtualization Authority (NVA). The NVE entities are in charge of connectivity and policy enforcement in a CNI environment, and get the respective control information from NVA (if not available in local cache). Typically, an NVE is located on a physical server, and serves the Virtual Machines (VM) hosted by this server. All traffic sent and received by a VM must traverse its hosting NVE. The NVA maintains the logical view of the network. This mechanism is for all kinds of traffic: unicast, multicast and broadcast.

For multicast in the CNI domain, the receiver VM sends an IGMP join packet. When the NVE receive this IGMP join, it will register a receiver to NVA with the following information: multicast address, VNID and host tunnel endpoint IP.

When the NVE receives a multicast sent by a source VM, the NVE will check with the NVA for the destination address and VNID and the NVA will respond with the necessary tunnel information which contains all the target NVEs for the multicast address. Then, the NVE carrying source VM will encapsulate the original multicast with a CNI header in which the destination address is a destination host tunnel IP. This mechanism allows overlay networks to transmit multicast traffic over an underlay network which doesn't support multicast traffic forwarding.

When a VM hosting in a VXLAN domain wants to communicate with a VM hosting in a CNI domain for multicast, it will not be achieved because of the different address resolve mechanisms in the control plane between VXLAN and CNI, however both VXLAN and CNI use the VXLAN frame encapsulation for tunneling. Currently, there is no solution to resolve this issue.

SUMMARY

According to one embodiment of the present invention, a method of communication between a first non-native protocol in a Virtual eXtensible LAN (VXLAN) domain and a second non-native protocol in a Centralized NVO3 implementation (CNI) domain through a Multicast Overlay Ferry Proxy (MOFP) comprising a VXLAN module within the VXLAN domain and a CNI module within the CNI domain connected through a ferry proxy. The method comprising the steps of: the VXLAN module receiving an input to join communication within the VXLAN domain; the VXLAN module configuring VNIDs in the VXLAN domain; the VXLAN module sending an Internet group management protocol report to the configured VNIDs to join a underlay multicast group for each VNID in the VXLAN domain; the VXLAN module receiving encapsulated packets of multicast traffic from hosts in the VXLAN domain; the VXLAN module decapsulating the multicast traffic packets and forwarding the decapsulated multicast traffic packets from the VXLAN domain to the CNI module within the multicast overlay via the ferry proxy; the CNI module within the multicast overlay ferry proxy receiving the decapsulated multicast traffic packets from the VXLAN module; and the CNI module re-encapsulating data from the multicast traffic packet and sending the data to a network virtual authority (NVA) for registration in the CNI domain.

According to another embodiment of the present invention, a computer program product for communication between a first non-native protocol in a Virtual eXtensible LAN (VXLAN) domain and a second non-native protocol in a Centralized NVO3 implementation (CNI) domain through a Multicast Overlay Ferry Proxy (MOFP) comprising a VXLAN module within the VXLAN domain and a CNI module within the CNI domain connected through a ferry proxy. The VXLAN module and CNI module comprising a computer comprising at least one processor, one or more memories, one or more computer readable storage media, the computer program product comprising a computer readable storage medium having program instructions embodied therewith. The program instructions executable by the computer to perform a method comprising: receiving, by the VXLAN module, an input to join communication within the VXLAN domain; configuring, by the VXLAN module, VNIDs in the VXLAN domain; sending, by the VXLAN module, an Internet group management protocol report to the configured VNIDs to join a underlay multicast group for each VNID in the VXLAN domain; receiving, by the VXLAN module, encapsulated packets of multicast traffic from hosts in the VXLAN domain; decapsulating, by the VXLAN module, the multicast traffic packets and forwarding the decapsulated multicast traffic packets from the VXLAN domain to the CNI module within the multicast overlay via the ferry proxy; within the Multicast Overlay Ferry Proxy (MOFP) receiving, by the CNI module, the decapsulated multicast traffic packets from the VXLAN module; and re-encapsulating, by the CNI module, data from the multicast traffic packet and sending the data to a network virtual authority (NVA) for registration in the CNI domain.

According to another embodiment of the present invention, a computer system for communication between a first non-native protocol in a Virtual eXtensible LAN (VXLAN) domain and a second non-native protocol in a Centralized NVO3 implementation (CNI) domain through a Multicast Overlay Ferry Proxy (MOFP) comprising a VXLAN module within the VXLAN domain and a CNI module within the CNI domain connected through a ferry proxy. The CNI module and VXLAN module each comprising a computer comprising at least one processor, one or more memories, one or more computer readable storage media having program instructions executable by the computer to perform the program instructions. The program instructions comprising: receiving, by the VXLAN module, an input to join communication within the VXLAN domain; configuring, by the VXLAN module, VNIDs in the VXLAN domain; sending, by the VXLAN module, an Internet group management protocol report to the configured VNIDs to join a underlay multicast group for each VNID in the VXLAN domain; receiving, by the VXLAN module, encapsulated packets of multicast traffic from hosts in the VXLAN domain; decapsulating, by the VXLAN module, the multicast traffic packets and forwarding the decapsulated multicast traffic packets from the VXLAN domain to the CNI module within the multicast overlay via the ferry proxy; within the Multicast Overlay Ferry Proxy (MOFP) receiving, by the CNI module, the decapsulated multicast traffic packets from the VXLAN module; and re-encapsulating, by the CNI module, data from the multicast traffic packet and sending the data to a network virtual authority (NVA) for registration in the CNI domain.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
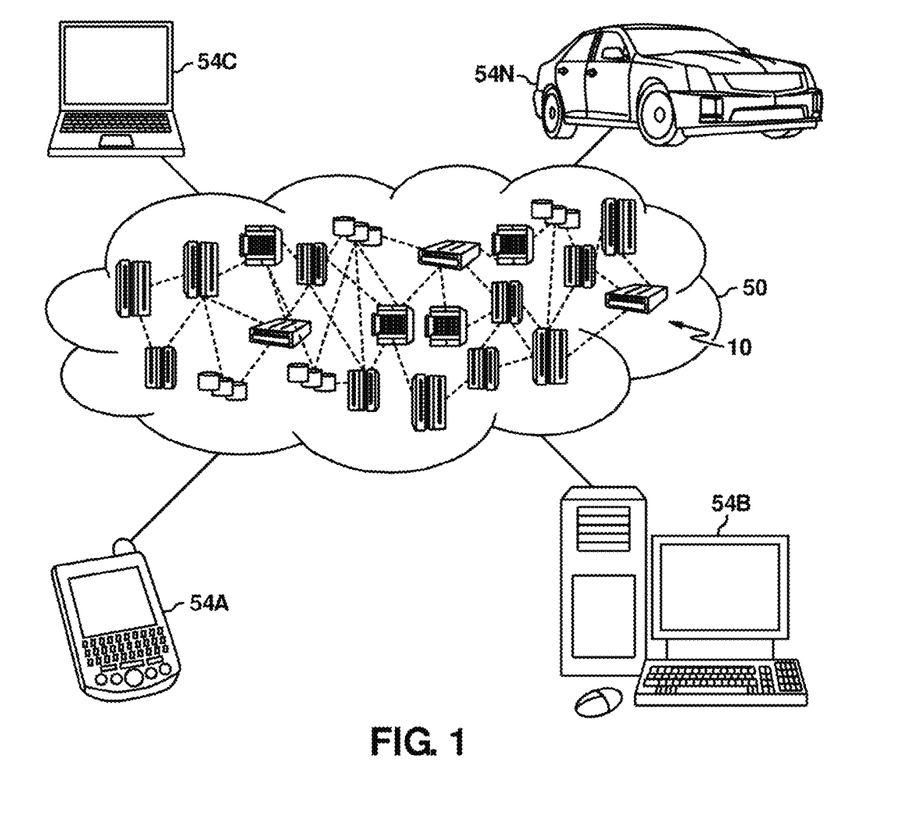
FIG. 1 depicts a cloud computing node according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
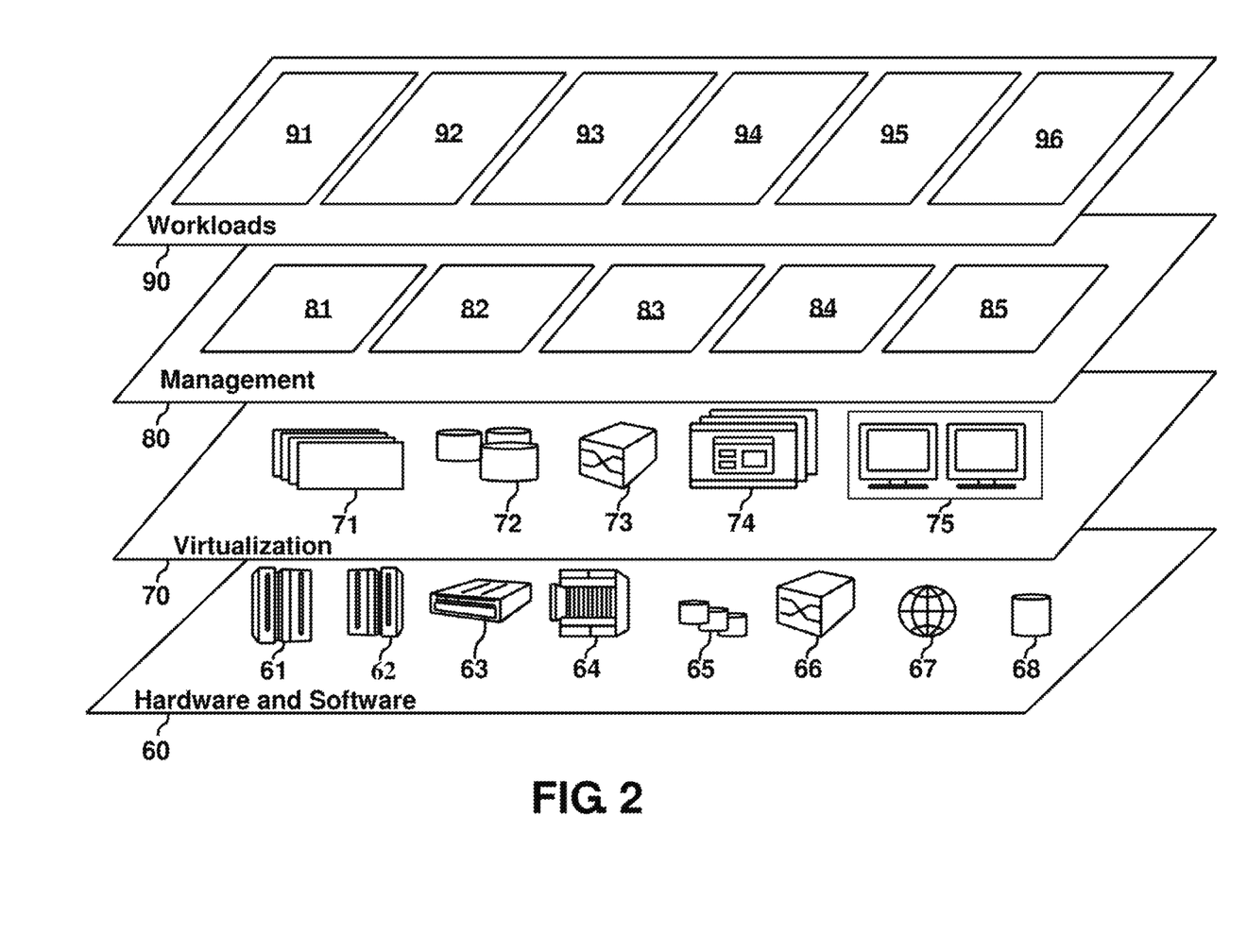
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intercommunication mechanisms 96.

In an embodiment of the present invention, multicast and broadcast communication is resolved between a VXLAN domain and a CNI domain by using VXLAN intercommunication.

A mechanism for multicast (M-VIM) is used to resolve address looking up problems for different types of VXLAN related overlay networks for multicast and broadcast traffics. A Multicast Overlay Ferry Proxy (MOFP) is introduced between the VXLAN domain and the CNI domain for ferrying control plane and data panel information. The M-VIM mechanism comprises three parts: 1) VXLAN Module; 2) CNI Module; and 3) a proxy mechanism.

Within the VXLAN Module, a VNID's range for intercommunication is defined. The network with these VNIDs intercommunicates between the VXLAN domain and the CNI domain. The VXLAN Module also sends an underlay multicast JOIN for receiving VXLAN domain multicast. The VXLAN module decapsulates packets for the CNI module. The VXLAN module is part of the VXLAN domain.

The CNI module receives the decapsulated packets from the VXLAN module via a proxy mechanism and uses the information from the packets to register the TEP IP of the VXLAN domain into the NVA of the CNI network. The CNI module is part of the CNI domain.

The proxy mechanism is used to ferry and facilitate the intercommunication between the two network domains, VXLAN and CNI by using the VXLAN module and CNI module in MOFP. The VXLAN module and CNI module act as proxy/gateway for its domain.

With the mechanism for multicast (M-VIM) of an embodiment of the present invention, the VMs in the VXLAN domain and the VMs in the CNI domain could receive multicast traffic from the other rival domain. The data forwarding plane must be changed, but the VLXAN domain and CNI domain are compatible and VM instances can communicate with each other directly.

By allowing the CNI domain to communicate directly with the VXLAN domain, IP multicast communication between the VXLAN domain and the CNI domain is available and compatible without a large change to existing infrastructure. Furthermore, the underlay network in the CNI domain no longer needs to support multicast, which is an advantage of CNI over legacy VXLAN and still keeps the advantages of provided by the CNI domain. In addition, a user's original infrastructure investments are maintained when upgrading and a user can choose a flexible solution to upgrade the networks, allowing a user to merge existed different overlay networks to achieve high performance, and remove the 4K VLAN limitation.

A multicast intercommunication mechanism is implemented in the MOFP to support multicast forwarding and registration. The MOFP processes incoming multicast packets, especially IGMP related packets, and registers for a multicast JOIN/LEAVE packet to the CNI domain through the NVA. The multicast data traffic from VXLAN domain to CNI domain needs to be forwarded by MOFP, and it can't be forwarded directly via underlay network as the VXLAN module is joined in the multicast group. However, for the CNI domain, there are no requirements on the underlying multicast support. In this case the MOFP works as a gateway for traffic coming from VXLAN domain. When forwarding traffic from the VXLAN domain to the CNI domain, the MOFP works as a multicast-enabled NVE to look up all endpoints of a target multicast group in the CNI domain and forward multiple copies of a single data packet for multiple possible targets in CNI domain.

In the reverse direction, from the CNI domain to the VXLAN domain, the MOFP registers the corresponding multicast Tunnel Endpoint (TEP) entry into the NVA for the certain multicast endpoints in the VXLAN domain. When the NVE in CNI domain sends multicast traffic, the CNI module queries the NVA about the corresponding TEPs for the multicast address. The CNI module uses the information from the NVA and sends the multicast traffic to the NVEs (TEPs) in the VXLAN domain by unicast.

The MOFP provides many advantages. For example, IP multicast traffic intercommunication between VXLAN domain and CNI domain becomes available and compatible, with no great change for existing infrastructure. Furthermore, multicasting overcomes the flaws of unicasting when traffic is sent from one node to many nodes (only one copy of traffic, no matter how many receivers), thereby saving network bandwidth.

Figure 3:
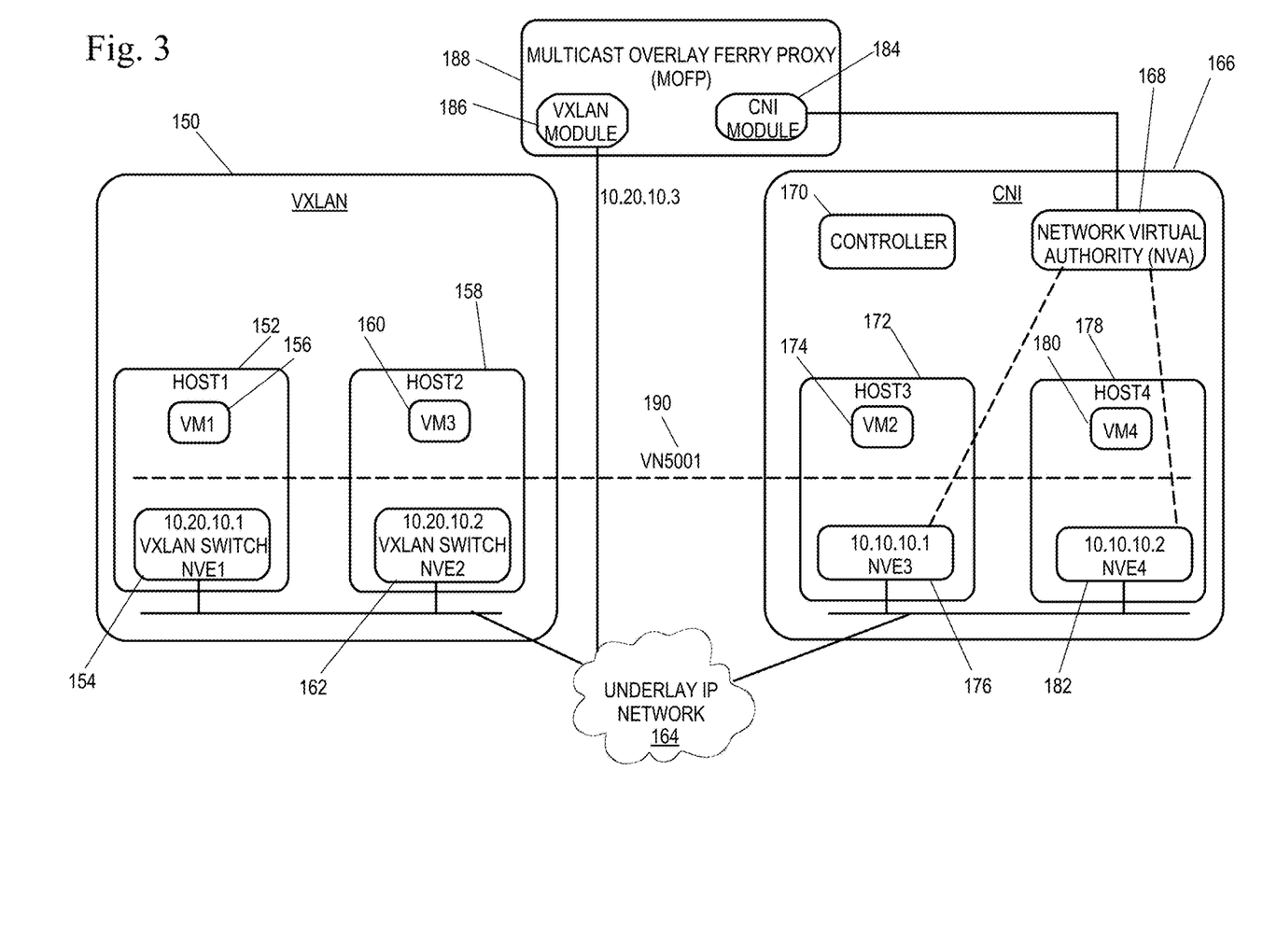
FIG. 3 shows a schematic of M-VIM architecture.

FIG. 3 shows an example of the MOFP connecting a CNI domain and a VXLAN domain.

The VXLAN domain (150) has at least Host1 (152) and Host2 (156) connected to each other and an underlay IP network (164). Within Host1 (152) is virtual machine one (VM1) (156) with a VXLAN switch NVE (154) with TEP IP 10.20.10.1. Within Host2 (156) is VM3 (160) with a VXLAN switch NVE2 (162) with TEP IP 10.20.10.2. Host1 (152) and Host2 (156) are connected to an underlay IP network (164).

The CNI domain (166) has a controller (170), Host3 (172) and Host4 (174). Host3 (172) has a VM2 (174) with NVE3 (176) with a TEP IP 10.10.10.1. Host4 (174) has VM4 (180) with NVE4 (182) with a TEP IP 10.10.10.2. VM1 (256) of Host1 (152), VM3 (160) of Host2 (156), VM2 (174) of Host3 (172) and VM4 (180) of Host4 (174) are all connected to a logical switch or VXLAN segment VNID 5001 (190).

NVE3 (176) and NVE4 (182) are connected to a network virtual authority (NVA) (168). The NVA (168) is connected to a multicast overlay ferry proxy (MOFP) (188). The MOFP (188) is a transferring entity that allows intercommunication between VXLAN domain (150) and the CNI domain (160). The MOFP (188) includes a VXLAN module (186) in communication with the underlay IP network (164) through IP address 10.20.10.3. The VXLAN module is part of the VXLAN domain and is added into all configured intercommunication VXLAN VNIDs.

The MOFP (188) additionally contains a ferry proxy and a CNI module (184) in communication with the NVA (168). The VXLAN module (186) is communication with the CNI module (184) through the ferry proxy, which may be a pipe. The ferry proxy converts the packets received by VXLAN module and forwards them to the CNI module in the CNI domain. The CNI module (184) registers receiver endpoint information to the NVA (168), which allows a multicast sender in the CNI domain to send traffic to a receiver in the VXLAN domain.

Figure 6:
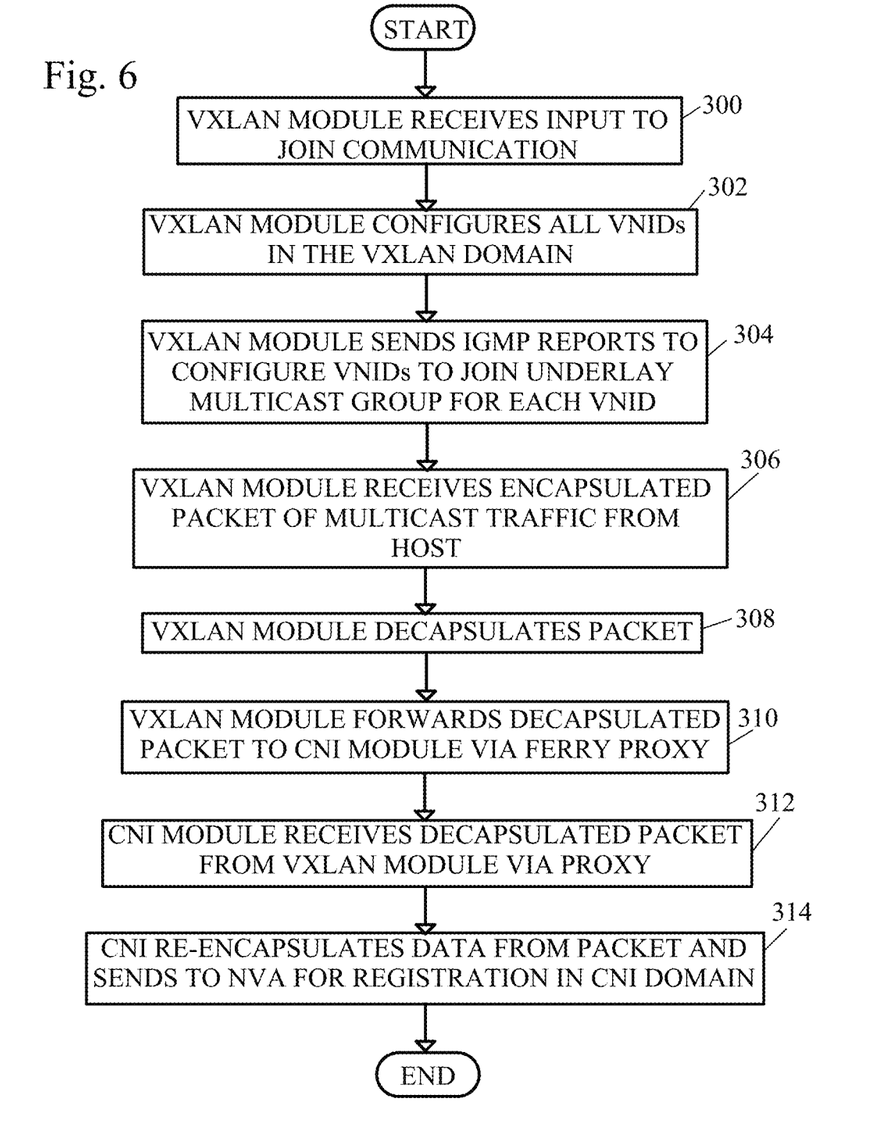
FIG. 6 shows a flow diagram of a method of communication between non-native protocols, a VXLAN domain and a CNI domain.

FIG. 6 shows a flow diagram of a method of between a VXLAN domain and a CNI domain, two non-native protocols.

In a first step, the VXLAN module receives an input to join communication within the VXLAN domain (step 300).

The VXLAN module then configures all VNIDs in the VXLAN domain (step 302).

The VXLAN module sends IGMP reports to the configured VNIDs to join the underlay multicast group for each VNID in the VXLAN domain (step 304).

The VXLAN module receives encapsulated packs of multicast traffic from hosts (step 306). The VXLAN module decapsulates the multicast traffic packets (step 308).

The VXLAN module then forward the decapsulated multicast traffic packets from the VXLAN domain to the CNI module within the MOFP via a ferry proxy (step 310).

The CNI module within the MOFP receives the decapsulated multicast traffic packets from the VXLAN module (step 312).

The CNI module re-encapsulates data from the multicast traffic packets and sends the data to the NVA for registration in the CNI domain (step 314).

After the completion of step 314, additional traffic from the VXLAN domain sent to the CNI domain by the VXLAN module receiving encapsulated packs of multicast traffic from hosts. The VXLAN module decapsulates the multicast traffic packets forwards the decapsulated multicast traffic packets from the VXLAN domain to the CNI module within the MOFP via a ferry proxy. The CNI module receives the decapsulated packets and looks up all endpoints of the target multicast group in the CNI domain, acting like a multicast-enabled NVE. The CNI module, based on the endpoints found, forwards multiple copies of a single data packet for multiple possible targets in CNI domain.

Figure 4:
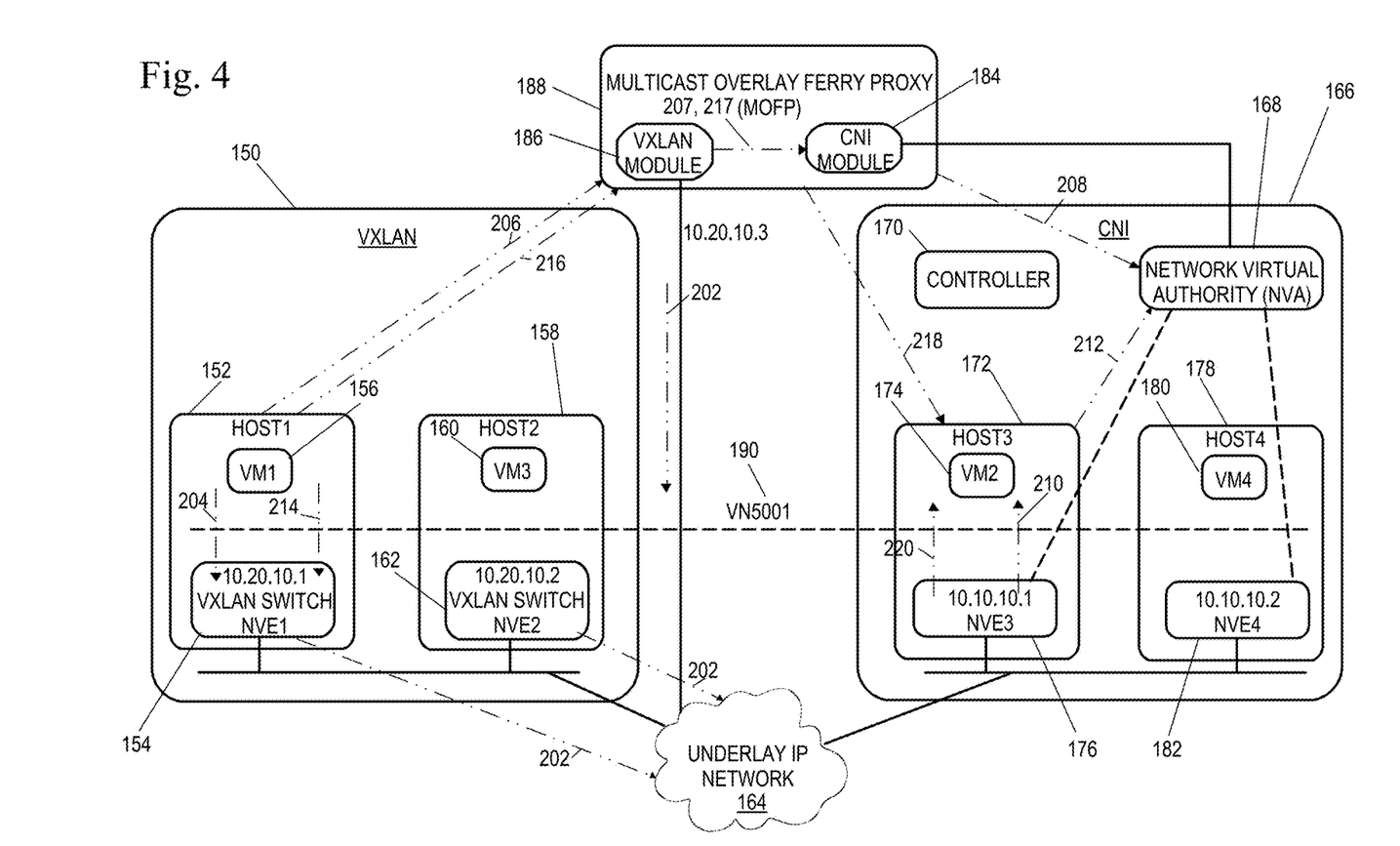
FIG. 4 shows an example of multicast traffic from a VXLAN domain to a CNI domain through a Multicast Overlay Ferry Proxy (MOFP).

FIG. 4 shows an example of the multicast traffic flow from the VXLAN domain to the CNI Domain through the Multicast Overlay Ferry Proxy (MOFP).

The VXLAN module (186) receives a prompt from a user to take part in the multicast communication. The VXLAN module (186) configures all VNIDs in the VXLAN domain by sending IGMP reports.

In FIG. 4, the VNID 5001's corresponding multicast address is 239.1.1.100. Therefore, VXLAN switch NVE1 (154), which belongs to VNID 5001 (190), and the MOFP VXLAN module (186) send IGMP reports for joining underlay multicast group 239.1.100 of the underlay IP network (164) (arrow 202).

The VM1 (156) sends a report for joining multicast group 226.1.1.1 in VNID 5001 (190) (arrow 204).

Packets of multicast traffic from the VM1 (156) of Host1 (152), due to the joining of Host1 (152) to the multicast group, is encapsulated with a VXLAN header in which the destination IP is 239.1.1.100 for underlay multicast and is multicasted to every NVE which has VNID 5001. The packet additional contains an inner IP destination multicast address of 226.1.1.1 within the CNI domain. The VXLAN module (186) of the MOFP (188) will receive the multicast packet since it has been configured to support VNID 5001 (arrow 206).

The VXLAN module (186) decapsulates the header of the received packet. The decapsulation removes an outer tag and exposes an inner IP destination address. Decapsulation means the outer tag of the packet VXLAN domain will be removed. Within the packet two layers are present, the inner layer of the original multicast packets, and the outer layer of the underlay VXLAN multicast header.

For example, removing address 239.1.1.100 for an outer destination and exposing address 226.1.1.1 of an inner IP destination multicast address in the CNI domain. After the VXLAN module (186) receives the packet from the VXLAN domain, it will decapsulate the outer tag, and exposing the address 226.1.1.1 in the CNI domain. The inner address may be reformatted into a CNI format either by the VXLAN module or by the CNI module. The decapsulated packet included related tunnel information is sent to the CNI module (184) via a ferry proxy (arrow 207).

The MOFP CNI module (184) receives the decapsulated packet. The CNI module encapsulates the packet and sends the packet and registers the tunnel information to the NVA. (168) of the CNI domain. The related tunnel information may include, but is not limited to the inner multicast address (226.1.1.1) of the packet, the VNID (5001) and it source TEP IP 10.20.10.1 (arrow 208). In this case, the TEP is the NVE (VXLAN switch) in Host1 (152).

VM2 (174) then sends a report for joining multicast group 226.1.1.1 in VNID 5001 (190) (arrow 210).

A multicast entry for VM2 (174) is created by NVE3 (176) and registered into NVA (168) with VNID 5001 and its TEP IP (NVE3 TEP IP) (arrow 212). Now both VM1 (156) and VM2 (174) are joined into the same multicast group 226.1.1.1, and they can send/receive multicast traffic for group 226.1.1.1.

VM1 (156) sends multicast traffic to group 226.1.1.1 (arrow 214).

The VXLAN switch NVE1 (154) encapsulates the VXLAN header for VNID 5001 (190) and sends to the underlay multicast group 239.1.1.100, and then the VXLAN module (186) of the MOFP (188) receives the multicast traffic (arrow 216).

After the VXLAN multicast packet is received by MOFP (188), VXLAN module (186) will decapsulate the VXLAN header and send the decapsulated packet information to the CNI module via a ferry proxy (arrow 217).

The CNI module receives the decapsulated packet. Based on the information in the packet, the CNI module queries the NVA (168) as to whether there are any corresponding multicast receivers in the CNI domain (166). If no multicast receivers are present in the CNI domain, the packet will be discarded. The NVA (168) sends a reply with the tunnel address information of VM2 (174). The CNI module (184) will encapsulate a new CNI header using a CNI frame and unicasts to NVE3 (176) in which VM2 (174) is located based on query results from the NVA (168) (arrow 218).

NVE3 (176), in which VM2 (174) is located, will receive and decapsulate the CNI header and sends the multicast packet with destination address 226.1.1.1 to VM2 (174) (arrow 220).

Figure 5:
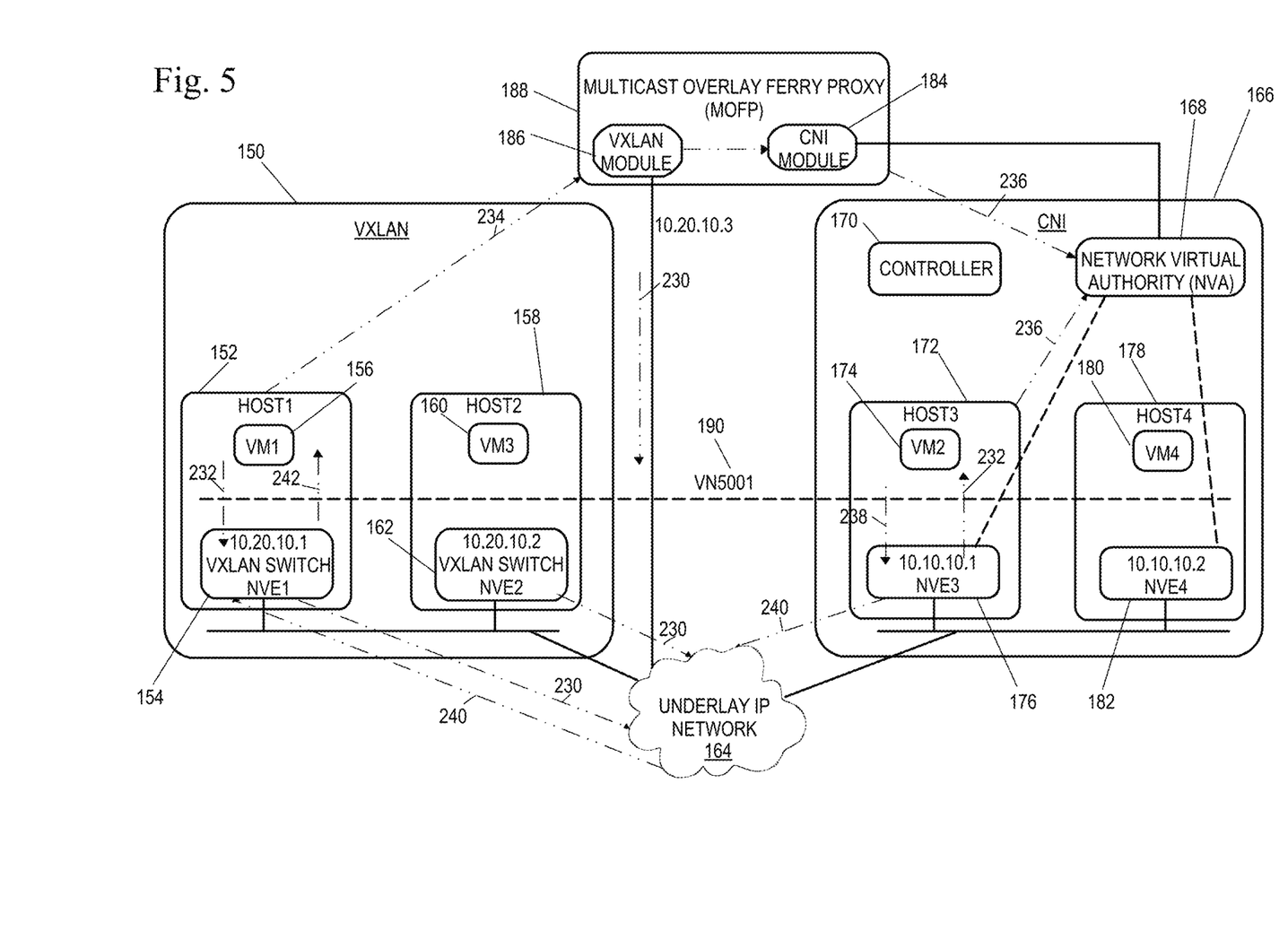
FIG. 5 shows an example of multicast traffic from CNI domain to VXLAN domain through a Multicast Overlay Ferry Proxy (MOFP).

FIG. 5 shows an example of the multicast traffic flow from the CNI domain to the VXLAN domain through a Multicast Overlay Ferry Proxy (MOFP).

All VXLAN switches which belong to VN 5001 and the MOFP VXLAN module (186) send IGMP reports for joining the underlay multicast group 239.1.1.100 for VNID 5001 (190) (arrow 230).

VM1 (156) and VM2 (174) each send an IGMP report for joining multicast group 226.1.1.1 in VNID 5001 (190) (arrow 232).

VM1 (156) traffic is encapsulated with a VXLAN header in which the destination IP is 239.1.1.100 for the underlay multicast. The VXLAN header is multicast to every NVE which has VNID 5001 (arrow 234). The VXLAN module 186 of the MOFP (188) receives the multicast packet since it has been configured to support VNID 5001 and has joined group 239.1.1.100.

The MOFP CNI module (184) registers the multicast entry 226.1.1.1 into NVA (168) with VNID 5001 and its source TEP IP 10.20.10.1 (arrow 236). The NVE3 (176) registers the multicast entry 226.1.1.1 into NVA (168) with VNID 5001 and its source TEP IP 10.10.10.1. VM1 (156) and VM2 (174) join same multicast group 226.1.1.1, and VM1 (156) and VM2 (174) can send/receive multicast traffic for group 226.1.1.1.

VM2 (174) sends multicast traffic in VNID 5001 for group 226.1.1.1 (arrow 238).

NVE3 (176) receives the multicast packet, and the NVE3 (176) queries the NVA (168) for the tunnel endpoint for group address 226.1.1.1 (arrow 240). The NVA (168) answers with the tunnel address of NVE in addition to those corresponding endpoints in the CNI domain (166). NVE3 (176) encapsulates the multicast packet with a VXLAN header and unicasts to NVE1 (154) directly based on the query results from the NVA (168).

The VXLAN switch (154) decapsulates VXLAN header and forwards the multicast packet in VNID 5001 (190), and then VM1 (156) receives the multicast packet for group 226.1.1.1 (arrow 242).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of communication between a first non-native protocol in a Virtual eXtensible LAN (VXLAN) domain and a second non-native protocol in a Centralized NVO3 implementation (CNI) domain through a multicast overlay ferry proxy comprising a VXLAN module within the VXLAN domain and a CNI module within the CNI domain connected through a ferry proxy comprising the steps of:

the VXLAN module receiving an input to join communication within the VXLAN domain;

the VXLAN module configuring VXLAN Network Identifiers (VNIDs) in the VXLAN domain;

the VXLAN module sending an Internet group management protocol report to the configured VNIDs to join a underlay multicast group for each VNID in the VXLAN domain;

the VXLAN module receiving encapsulated packets of multicast traffic from hosts in the VXLAN domain;

the VXLAN module decapsulating the multicast traffic packets and forwarding the decapsulated multicast traffic packets from the VXLAN domain to the CNI module within the multicast overlay via the ferry proxy;

the CNI module within the multicast overlay ferry proxy receiving the decapsulated multicast traffic packets from the VXLAN module;

the CNI module re-encapsulating data from the multicast traffic packet and sending the data to a network virtual authority for registration in the CNI domain;

the CNI module searching for endpoints of a target multicast group designated in the multicast traffic packets in the CNI domain; and the CNI module, based on endpoints received from the search, sending multiple copies of a single data packet to destinations in CNI domain for decapsulation.

2. The method of claim 1, wherein the data in the multicast traffic packet sent for registration in the network virtual authority comprises a source and a VXLAN Network Identifier.

3. The method of claim 1, wherein decapsulating the multicast traffic packets by the VXLAN module is done by removing an outer tag containing a first IP address and exposing an inner IP destination multicast address in the CNI domain.

4. A computer program product for communication between a first non-native protocol in a Virtual eXtensible LAN (VXLAN) domain and a second non-native protocol in a Centralized NVO3 implementation (CNI) domain through a multicast overlay ferry proxy comprising a VXLAN module within the VXLAN domain and a CNI module within the CNI domain connected through a ferry proxy, the CNI module and VXLAN module comprising a computer comprising at least one processor, one or more memories, one or more non-transitory computer readable storage media, the computer program product comprising a computer readable storage medium having program instructions embodied therewith, the program instructions executable by the computer to perform a method comprising:

receiving, by the VXLAN module, an input to join communication within the VXLAN domain;

configuring, by the VXLAN module, VXLAN Network Identifiers (VNIDs) in the VXLAN domain;

sending, by the VXLAN module, an Internet group management protocol report to the configured VNIDs to join a underlay multicast group for each VNID in the VXLAN domain;

receiving, by the VXLAN module, encapsulated packets of multicast traffic from hosts in the VXLAN domain;

decapsulating, by the VXLAN module, the multicast traffic packets and forwarding the decapsulated multicast traffic packets from the VXLAN domain to the CNI module within the multicast overlay via the ferry proxy;

within the multicast overlay ferry proxy receiving, by the CNI module, the decapsulated multicast traffic packets from the VXLAN module;

re-encapsulating, by the CNI module, data from the multicast traffic packet and sending the data to a network virtual authority for registration in the CNI domain;

searching, by the CNI module, for endpoints of a target multicast group designated in the multicast traffic packets in the CNI domain; and based on endpoints received from the search, sending, by the CNI module, multiple copies of a single data packet to destinations in CNI domain.

5. The computer program product of claim 4, wherein the data in the multicast traffic packet sent for registration in the network virtual authority comprises a source and a VXLAN Network Identifier.

6. The computer program product of claim 4, wherein decapsulating, by the VXLAN module, the multicast traffic packets is done by removing an outer tag containing a first IP address and exposing an inner IP destination multicast address in the CNI domain.

7. A computer system for communication between a first non-native protocol in a Virtual eXtensible LAN (VXLAN) domain and a second non-native protocol in a Centralized NVO3 implementation (CNI) domain through a multicast overlay ferry proxy comprising a VXLAN module within the VXLAN domain and a CNI module within the CNI domain connected through a ferry proxy, the CNI module and VXLAN module each comprising a computer comprising at least one processor, one or more memories, one or more non-transitory computer readable storage media having program instructions executable by the computer to perform the program instructions comprising:

receiving, by the VXLAN module, an input to join communication within the VXLAN domain;

configuring, by the VXLAN module, VXLAN Network Identifiers (VNIDs) in the VXLAN domain;

sending, by the VXLAN module, an Internet group management protocol report to the configured VNIDs to join a underlay multicast group for each VNID in the VXLAN domain;

receiving, by the VXLAN module, encapsulated packets of multicast traffic from hosts in the VXLAN domain;

decapsulating, by the VXLAN module, the multicast traffic packets and forwarding the decapsulated multicast traffic packets from the VXLAN domain to the CNI module within the multicast overlay via the ferry proxy;

within the multicast overlay ferry proxy receiving, by the CNI module, the decapsulated multicast traffic packets from the VXLAN module;

re-encapsulating, by the CNI module, data from the multicast traffic packet and sending the data to a network virtual authority for registration in the CNI domain;

searching, by the CNI module, for endpoints of a target multicast group designated in the multicast traffic packets in the CNI domain; and based on endpoints received from the search, sending, by the CNI module, multiple copies of a single data packet to destinations in CNI domain.

8. The computer system of claim 7, wherein the data in the multicast traffic packet sent for registration in the network virtual authority comprises a source and a VXLAN Network Identifier.

9. The computer system of claim 7, wherein decapsulating, by the VXLAN module, the multicast traffic packets is done by removing an outer tag containing a first IP address and exposing an inner IP destination multicast address in the CNI domain.

* * * * *